(12) United States Patent
Hsin et al.

(10) Patent No.: US 8,862,068 B2
(45) Date of Patent: Oct. 14, 2014

(54) WIRELESS APPARATUS AND INTERFERENCE DETERMINATION METHOD THEREOF

(75) Inventors: Chien-Wei Hsin, Kaohsiung (TW); Chung-Yao Chang, Zhubei (TW)

(73) Assignee: Realtek Semiconductor Corporation, Hsinchu (TW)

( * ) Notice: Subject to any disclaimer, the term of this patent is extended or adjusted under 35 U.S.C. 154(b) by 221 days.

(21) Appl. No.: 13/616,510

(22) Filed: Sep. 14, 2012

(65) Prior Publication Data

US 2013/0316660 A1 Nov. 28, 2013

(30) Foreign Application Priority Data

May 28, 2012 (TW) .............................. 101119002 A

(51) Int. Cl.
*H04B 17/00* (2006.01)
*H04B 1/00* (2006.01)

(52) U.S. Cl.
USPC ................... 455/67.11; 455/63.1; 455/226.1

(58) Field of Classification Search
USPC .......... 455/41.1, 41.2, 63.1, 67.11, 67.13, 73, 455/226.1, 226.3, 515
See application file for complete search history.

(56) References Cited

U.S. PATENT DOCUMENTS

| 8,155,482 | B2 * | 4/2012 | Chan et al. ..................... 382/305 |
| 8,462,709 | B2 * | 6/2013 | Nanda et al. .................. 370/329 |
| 8,571,591 | B2 * | 10/2013 | Liu et al. ........................ 455/515 |
| 8,625,562 | B2 * | 1/2014 | Noh et al. ...................... 370/338 |
| 8,687,572 | B2 * | 4/2014 | Park .............................. 455/515 |
| 2011/0299417 | A1 | 12/2011 | Nanda et al. |

OTHER PUBLICATIONS

Taiwan Office Action for Taiwan Application No. 101119002, dated May 22, 2014. Partial English language translation provided.

* cited by examiner

*Primary Examiner* — Quochien B Vuong
(74) *Attorney, Agent, or Firm* — Patterson Thuente Pedersen, P.A.

(57) ABSTRACT

A wireless apparatus and an interference determination method thereof are provided. The wireless apparatus determines that the wireless apparatus operates in a first bandwidth mode, and counts a first clear channel assessment (CCA) number associated with a primary channel, a second CCA number associated with a secondary channel, an entire CCA number associated with either the primary channel or the secondary channel, and the false alarm number according to at least one received radio frequency (RF) signal. Afterwards, the wireless apparatus determines that the second CCA number exceeds the summation of the first CCA number and bias number to determine that it is in an interference state, and determines that the interference state belongs to either the first interference type or second interference type according to the radio of the entire CCA number to the FA number.

32 Claims, 9 Drawing Sheets ately to ensure the transmission performance thereof.
WIRELESS APPARATUS AND INTERFERENCE DETERMINATION METHOD THEREOF This application claims the benefit of priority based on Taiwan Patent Application No. 101119002 filed on May 28, 2012, which is hereby incorporated by reference in its entirety.

CROSS-REFERENCES TO RELATED APPLICATIONS

Not applicable.

BACKGROUND

1. Technical Field

The disclosure relates to a wireless apparatus and an interference determination method thereof.

2. Descriptions of the Related Art

With the development of wireless local area networks (WLANs), the Institute of Electrical and Electronic Engineers (IEEE) has formulated the newest wireless network standard 802.11n to meet the demand for a high throughput (TP). Apart from supporting the 20 MHz transmission bandwidth specified in the original standards 802.11a, 802.11b and 802.11g, the standard 802.11n further supports a 40 MHz transmission bandwidth; that is, the standard 802.11n uses two adjacent 20 MHz channels as one 40 MHz channel to increase the throughput.

WLAN wireless apparatuses use a 2.4 GHz frequency band for signal transmission. However, the 2.4 GHz frequency band is shared by many kinds of wireless apparatuses such as Bluetooth apparatuses, household wireless telephones and WLAN apparatuses. Therefore, when a WLAN wireless apparatus operates in the 2.4 GHz frequency band and uses the 40 MHz transmission bandwidth, the WLAN wireless apparatus will be prone to signal interference from other wireless apparatuses using the same frequency band, which affects the transmission performance. In this case, if interference cannot be solved effectively, then the throughput of the WLAN wireless apparatus using the 40 MHz transmission bandwidth for signal transmission will be reduced significantly, and may even be lower than the throughput of the WLAN wireless apparatus when the 20 MHz transmission bandwidth is used for signal transmission.

In view of this, it is important to provide a solution for reducing the possibility that the throughput of a WLAN wireless apparatus is affected by signal interference from other wireless apparatuses.

BRIEF SUMMARY

An objective of the disclosure is to provide a wireless apparatus and an interference determination method thereof. The wireless apparatus of the disclosure determines whether it is in an interference state by comparing clear channel assessment (CCA) numbers of two channels, and determines whether the interference state is a first interference type or a second interference type according to the ratio of an entire CCA number to a false alarm (FA) number. Thus, the wireless apparatus can reduce the influence of interference according to the first interference type and the second interference type respectively to ensure the transmission performance thereof.

In an exemplary embodiment, a wireless apparatus is disclosed, which comprises a radio frequency (RF) circuit and a processing circuit. The RF circuit is configured to receive at least one RF signal from a primary channel and a secondary channel. The processing circuit is electrically connected to the RF circuit, and is configured to determine that the wireless apparatus operates in a first bandwidth mode, and count a first clear channel assessment (CCA) number associated with the primary channel, a second CCA number associated with the secondary channel, an entire CCA number associated with at least one of the primary channel and the secondary channel and a false alarm (FA) number according to the at least one RF signal. The processing circuit is further configured to determine that the second CCA number exceeds a summation of the first CCA number and a bias number so as to determine that the wireless apparatus is in an interference state, and determine that the interference state belongs to one of a first interference type and a second interference type according to a ratio of the entire CCA number to the FA number.

In another exemplary embodiment, an interference determination method used in a wireless apparatus is disclosed. The wireless apparatus comprises an RF circuit and a processing circuit electrically connected to the RF circuit. The interference determination method comprises the following steps of: (a) enabling the processing circuit to determine that the wireless apparatus operates in a first bandwidth mode; (b) enabling the RF circuit to receive at least one RF signal from a primary channel and a secondary channel; (c) enabling the processing circuit to count a first CCA number associated with the primary channel, a second CCA number associated with the secondary channel, an entire CCA number associated with at least one of the primary channel and the secondary channel and an FA number according to the at least one RF signal; (d) enabling the processing circuit to determine that the second CCA number exceeds a summation of the first CCA number and a bias number so as to determine that the wireless apparatus is in an interference state; and (e) enabling the processing circuit to determine that the interference state belongs to one of a first interference type and a second interference type according to a ratio of the entire CCA number to the FA number.

DETAILED DESCRIPTION

In the following descriptions, the disclosure will be explained with reference to embodiments thereof. However, these embodiments are not intended to limit the disclosure to any specific environment, applications or particular implementations described in these embodiments. Therefore, the description of these embodiments is only for purpose of illustration rather than to limit the disclosure. It shall be appreciated that in the following embodiments and attached drawings, elements not directly related to the disclosure are omitted from depiction; and dimensional relationships among individual elements in the attached drawings are illustrated only for the ease of understanding but not to limit the actual scale.

Figure 1:
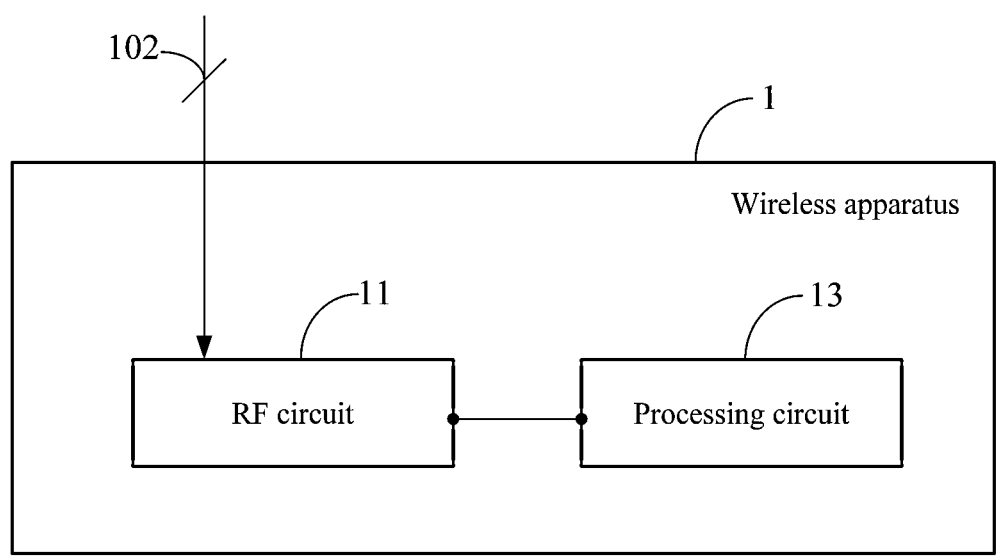
FIG. 1 is a schematic view of a wireless apparatus 1 of the disclosure.

The first embodiment is shown in FIG. 1, which is a schematic view of a wireless apparatus 1. The wireless apparatus 1 comprises a radio frequency (RF) circuit 11 and a processing circuit 13. In this embodiment, the wireless apparatus 1 is a WLAN wireless apparatus conforming to an IEEE 802.11n standard, and may be either an access point or a wireless network card. It shall be appreciated that for simplicity of description, detailed circuits in the wireless apparatus 1 that are less related to the disclosure are omitted from depiction, and will not be further described herein either.

The wireless apparatus 1 can operate in a first bandwidth mode (e.g., a 40 MHz transmission bandwidth mode) and a second bandwidth mode (e.g., a 20 MHz transmission bandwidth mode). When the wireless apparatus 1 operates in the first bandwidth mode, the RF circuit 11 receives one or more consecutive RF signals 102 from a primary channel P_CH and a secondary channel S_CH. Furthermore, when the wireless apparatus 1 operates in the second bandwidth mode, the RF circuit 11 receives one or more consecutive RF signals 102 from only the primary channel. It shall be noted that the RF signal(s) 102 may include various RF signals transmitted in a 2.4 GHz frequency band such as WLAN signals, Bluetooth signals and so on.

Figure 2:
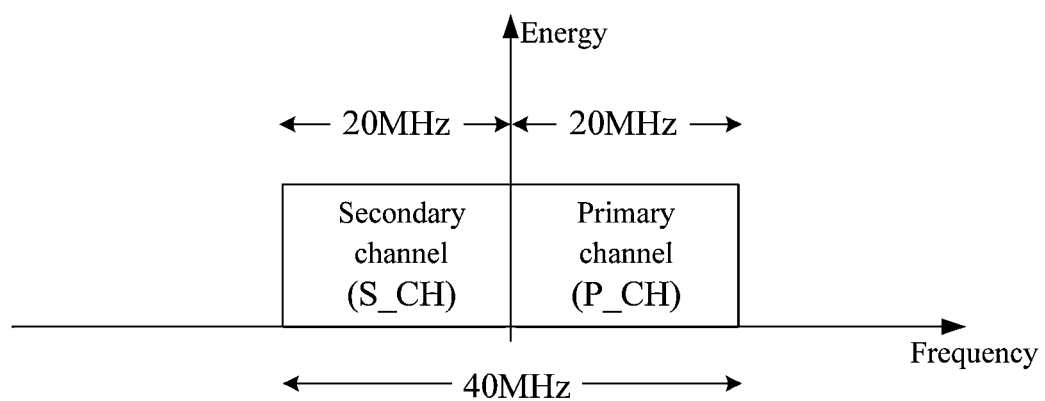
FIG. 2 is a schematic view of an operating frequency band of the wireless apparatus 1.

FIG. 2 is a schematic view depicting an operating frequency band of the wireless apparatus 1. The wireless apparatus 1 chooses from the 2.4 GHz frequency band a 20 MHz transmission bandwidth as the primary channel P_CH and an adjacent 20 MHz transmission bandwidth as the secondary channel S_CH according to the IEEE 802.11n standard. In this embodiment, the primary channel P_CH that is chosen by the wireless apparatus 1 is assumed to be relatively clean as compared to the secondary channel S_CH; that is, the signal interference mainly appears in the secondary channel S_CH. The method in which the relatively clean channel is chosen as the primary channel P_CH is not comprised in the technical contents that are primarily discussed in the disclosure and can be achieved by those of ordinary skill in the art on the basis of the prior art, and thus, will not be further described herein.

The processing circuit 13 is electrically connected to the RF circuit 11, and is configured to determine that the wireless apparatus 1 operates in one of the first bandwidth mode and the second bandwidth mode. When the wireless apparatus 1 operates in the first bandwidth mode, the processing circuit 13 counts a first clear channel assessment (CCA) number associated with the primary channel P_CH, a second CCA number associated with the secondary channel S_CH, an entire CCA number associated with at least one of the primary channel P_CH and the secondary channel S_CH and a false alarm (FA) number according to the RF signal(s) 102 that is received by the RF circuit 11. For example, the processing circuit may comprise a plurality of counters, which are configured to count the first CCA number, the second CCA number, the entire CCA number and the FA number respectively.

Specifically, on the basis of the CCA mechanism in the IEEE 802.11n standard, the processing circuit 13 determines whether the primary channel P_CH and the secondary channel S_CH are idle according to the energy of the RF signal(s) 102 received by the RF circuit 11 from the primary channel P_CH and the secondary channel S_CH, respectively. If the energy of the RF signal(s) 102 received from the primary channel P_CH is larger than a threshold, then the primary channel P_CH is busy. Similarly, if the energy of the RF signal(s) 102 received from the secondary channel S_CH is larger than the threshold, then the secondary channel S_CH is busy. The processing circuit 13 counts the numbers of times when the primary channel P_CH and the secondary channel S_CH are busy (i.e., the first CCA number and the second CCA number) respectively. Furthermore, the processing circuit 13 further counts the entire CCA number when either of the primary channel P_CH and the secondary channel S_CH is busy. In other words, once either or both of the primary channel P_CH and the secondary channel S_CH are busy, then the processing circuit 13 increments the value of the entire CCA number to count the number of times when the current 40 MHz transmission bandwidth is busy.

The processing circuit 13 considers the current 40 MHz transmission bandwidth to be busy (i.e., currently there may be one or more RF signals 102 to be transmitted to the wireless apparatus 1) if either the primary channel P_CH or the secondary channel S_CH is busy. In this case, the processing circuit 13 receives the RF signal(s) 102 from the RF circuit 11 and processes the RF signal(s) 102. When the processing circuit 13 processes the RF signal(s) 102 and the RF signal(s) 102 are not WLAN signals or are WLAN signals that are not to be transmitted to the wireless apparatus 1, then the determination in which the current 40 MHz transmission bandwidth is busy is viewed as a FA and the FA number is incremented.

Figure 3:
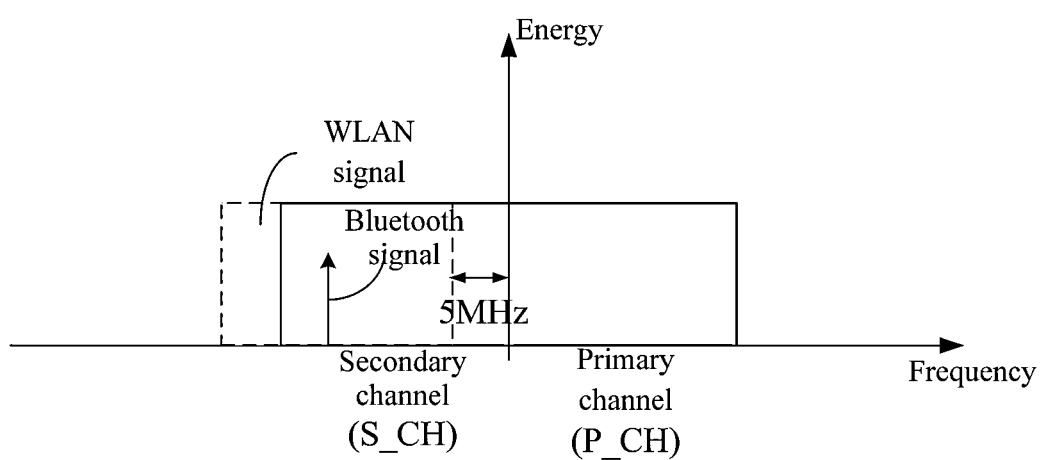
FIG. 3 depicts a case of the first interference type.
Figure 4:
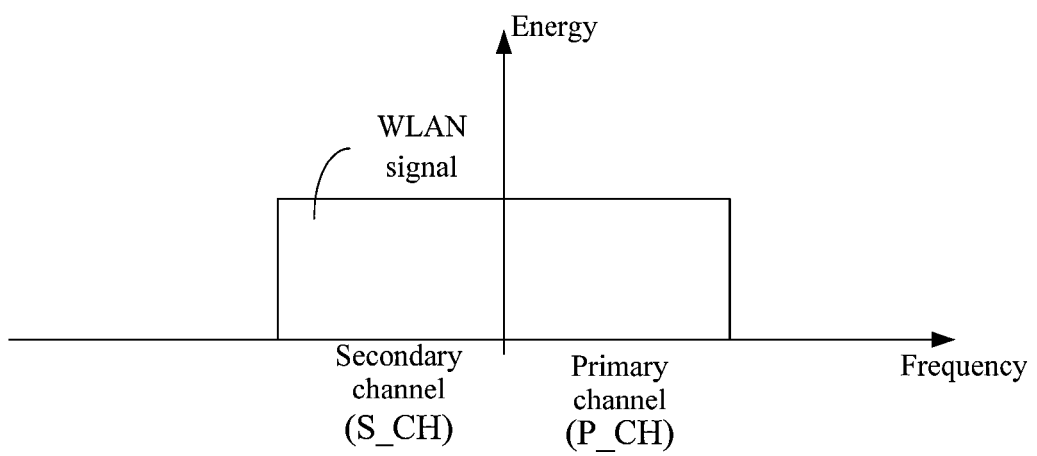
FIG. 4 depicts a case of the second interference type.

As described previously, the RF signal(s) 102 may be various RF signals transmitted in the 2.4 GHz frequency band; and even if the RF signal(s) 102 are WLAN signals, they may be WLAN signals that are not to be transmitted to the wireless apparatus 1. For example, as shown in FIG. 3, Bluetooth signals of a narrow band and WLAN signals that partially overlap with the secondary channel S_CH (i.e., WLAN signals shifted by 5 MHz) may appear in the secondary channel S_CH. Furthermore, as shown in FIG. 4, WLAN signals that use the same 20 MHz transmission bandwidth may appear in the secondary channel S_CH; however, the WLAN signals are to be transmitted to another WLAN wireless apparatus rather than to the wireless apparatus 1. In this embodiment, signal interference generated by the RF signals as shown in FIG. 3 is classified into a first interference type. Signal interference generated by the RF signals as shown in FIG. 4 is classified into a second interference type.

In the presence of the aforesaid signal interference, the processing circuit 13 determines that the secondary channel S_CH is busy, so the processing circuit 13 receives and processes the RF signal(s) 102 but misses the RF signal(s) 102 that are truly to be transmitted to the wireless apparatus 1. As a consequence, the throughput is reduced significantly, and may even be lower than the throughput of the wireless apparatus 1 when operating in the second bandwidth mode (the 20 MHz transmission bandwidth mode). To determine whether the wireless apparatus 1 is in an interference state (which belongs to one of the aforesaid two interference types), the processing circuit 13 determines whether the second CCA number exceeds a summation of the first CCA number and a bias number. When the second CCA number exceeds the summation of the first CCA number and the bias number, the processing circuit 13 determines that the wireless apparatus is in the interference state. Then, the processing circuit 13 determines that the interference state belongs to one of the first interference type and the second interference type according to a ratio of the entire CCA number to the FA number.

When determining that the ratio is larger than a preset ratio, the processing circuit 13 determines that the interference state belongs to the first interference type. On the contrary, when determining that the ratio is no larger than (i.e., smaller than or equal to) the preset ratio, the processing circuit 13 determines that the interference state belongs to the second interference type. Thus, the wireless apparatus 1 can perform corresponding processing operations according to the first interference type and the second interference type respectively to reduce the influence of the interference, thereby, ensuring the throughput of the wireless apparatus 1.

The second embodiment is also as shown in FIG. 1. In this embodiment, the wireless apparatus 1 is an access point or a wireless network card that is set to be in an independent basic service set (IBSS) mode. After determining that the wireless apparatus 1 operates in the first bandwidth mode, the processing circuit 13 further determines whether the wireless apparatus 1 is connected to a user equipment (UE). If the wireless apparatus 1 is connected to the UE, then the processing circuit 13 determines whether the entire CCA number exceeds a CCA threshold and whether the second CCA number exceeds the summation of the first CCA number and the bias number. If the entire CCA number exceeds the CCA threshold and the second CCA number exceeds the summation of the first CCA number and the bias number, then the wireless apparatus 1 is determined to be in the interference state.

On the other hand, if the processing circuit 13 determines that the wireless apparatus 1 is connected to the UE, then the processing circuit 13 further determines whether the UE operates in the first bandwidth mode or the second bandwidth mode. If it is determined that the UE operates in the first bandwidth mode (the 40 MHz transmission bandwidth mode), then the processing circuit 13 further determines whether the wireless apparatus 1 is in the interference state. Specifically, if the processing circuit 13 has identified, before the wireless apparatus 1 is connected to the UE, that the wireless apparatus 1 as being in the interference state, then the processing circuit 13 marks the wireless apparatus 1 in the interference state and also marks the type of the interference state. On the contrary, if the processing circuit 13 has determined that the wireless apparatus 1 is not in the interference state, then the processing circuit 13 marks that the wireless apparatus 1 is not in the interference state. For example, the processing circuit 13 may use a flag value to represent whether the wireless apparatus 1 is in the interference state. Specifically, when the flag value is 0, the wireless apparatus 1 is not in the interference state; and when the flag value is 1, the wireless apparatus 1 is in the interference state. The aforesaid flag value may be stored in the register of the processing circuit 13 or an additional storage device of the wireless apparatus 1.

Then, if the wireless apparatus 1 is not in the interference state yet, then the processing circuit 13 determines whether a throughput is larger than a throughput threshold. If the throughput is smaller than or equal to the throughput threshold, then the processing circuit 13 determines whether the entire CCA number exceeds the CCA threshold and whether the second CCA number exceeds a summation of the first CCA number and a bias number Bias_1 to determine whether the wireless apparatus 1 is in the interference state. At this point, if the wireless apparatus 1 is in the interference state, then the type of the interference state will be further determined.

In addition, if the throughput is larger than the throughput threshold, then the processing circuit 13 determines whether the second CCA number exceeds a summation of the first CCA number and a bias number Bias_2 to determine whether the wireless apparatus 1 is in the interference state. Similarly, if the wireless apparatus 1 is in the interference state, then the type of the interference state will be further determined. It shall be appreciated that in this embodiment, the bias number Bias_1 and the bias number Bias_2 are different numerical values; however, in other embodiments, the bias number Bias_1 and the bias number Bias_2 may also be the same numerical value.

Furthermore, if the processing circuit 13 determines that the wireless apparatus 1 is in the interference state after it is determined that the wireless apparatus 1 has been connected to the UE and the UE operates in the first bandwidth mode (the 40 MHz transmission bandwidth mode), then the processing circuit 13 further determines whether the interference state belongs to the first interference type or the second interference type. If the interference state belongs to the first interference type, then the processing circuit 13 receives from the RF circuit 11 and processes the subsequent at least one RF signal 102 according to only a first CCA of the primary channel P_CH. In other words, in this case, the processing circuit 13 receives from the RF circuit 11 and processes the subsequent at least one RF signal 102 according to only whether the primary channel P_CH is busy, and this can prevent the processing circuit 13 from receiving from the RF circuit 11 and processing a non-WLAN signal or a WLAN signal not to be transmitted to the wireless apparatus 1 due to signal interference in the secondary channel S_CH.

In addition, if the interference state belongs to the second interference type, then the processing circuit 13 enables the RF circuit 11 to broadcast a duplicate request-to-send (duplicate RTS) message. Thus, by broadcasting the duplicate RTS message, the wireless apparatus 1 can coordinate with other WLAN apparatuses, which uses the same 20 MHz transmission bandwidth (i.e., the secondary channel S_CH), to share the transmission bandwidth to avoid signal collision and avoid receiving and processing the WLAN signal not to be transmitted to the wireless apparatus 1. Apart from this, if the processing circuit 13 determines that the UE operates in the second bandwidth mode (the 20 MHz transmission bandwidth mode) after it is determined that the wireless apparatus 1 is connected to the UE, then the processing circuit 13 receives from the RF circuit 11 and processes the subsequent RF signal(s) 102 according to only the first CCA of the primary channel.

As can be known from the second embodiment, the disclosure determines whether the wireless apparatus is in the interference state and then determines whether the interference state belongs to either the first interference type or the second interference type. If the interference state and the interference type have been determined once the wireless apparatus is connected to the UE and both the wireless apparatus and the UE operate in the first bandwidth mode (the 40 MHz transmission bandwidth mode), then corresponding processing operations can be performed according to the interference type to reduce the influence of the interference to ensure the throughput of the wireless apparatus.

The third embodiment of the disclosure is also as shown in FIG. 1. In this embodiment, the wireless apparatus 1 is a wireless network card of a UE. After the processing circuit 13 determines that the wireless apparatus 1 operates in the first bandwidth mode, the processing circuit 13 further determines whether the wireless apparatus 1 is in the interference state. It shall be appreciated that the wireless apparatus 1 is preset to be in a non-interference state; that is, when the processing circuit 13 has not performed the following determination of the interference state, the wireless apparatus 1 is in the non-interference state.

If the wireless apparatus 1 is not in the interference state yet, then the processing circuit 13 determines whether the throughput is larger than the throughput threshold. If the throughput is smaller than or equal to the throughput threshold, then the processing circuit 13 determines whether the entire CCA number exceeds the CCA threshold and whether the second CCA number exceeds the summation of the first CCA number and bias number Bias_1 to determine whether the wireless apparatus 1 is in the interference state. At this point, if it is determined that the wireless apparatus 1 is in the interference state, then the type of the interference state will be further determined.

In addition, if the throughput is larger than the throughput threshold, then the processing circuit 13 determines whether the second CCA number exceeds the summation of the first CCA number and a bias number Bias_2 to determine whether the wireless apparatus 1 is in the interference state. Similarly, if the wireless apparatus 1 is in the interference state, then the type of the interference state will be further determined. It shall be appreciated that in this embodiment, the bias number Bias_1 and the bias number Bias_2 are different numerical values; however, in other embodiments, the bias number Bias_1 and the bias number Bias_2 may be the same numerical value. Settings of the bias number Bias_1 and the bias number Bias_2 are correlated with whether the throughput is larger than the throughput threshold. The settings of the bias numbers determine the proportion by which the second CCA number exceeds the first CCA number. For example, the bias numbers may be set on the basis that the second CCA number exceeds 1.5 times of the first CCA number.

If the processing circuit 13 determines that the wireless apparatus 1 is in the interference state, then the processing circuit 13 further determines whether the interference state belongs to the first interference type or the second interference type. If the interference state belongs to the first interference type, then the processing circuit 13 receives from the RF circuit 11 and processes the subsequent at least one RF signal 102 according to only the first CCA of the primary channel P_CH. In other words, the processing circuit 13 receives from the RF circuit 11 and processes the subsequent at least one RF signal 102 according to only whether the primary channel P_CH is busy, and this can prevent the processing circuit 13 from receiving and processing a non-WLAN signal or a WLAN signal not to be transmitted to the wireless apparatus 1 due to signal interference in the secondary channel S_CH.

In addition, if the interference state belongs to the second interference type, then the processing circuit 13 enables the RF circuit 11 to broadcast a duplicate RTS message. Thus, by broadcasting the duplicate RTS message, the wireless apparatus 1 can coordinate with other WLAN apparatuses, which use the same 20 MHz transmission bandwidth (i.e., the secondary channel S_CH), to share the transmission bandwidth to avoid signal collision and avoid the receipt and processing of the WLAN signal that should not to be transmitted to the wireless apparatus 1.

As can be known from the third embodiment, the disclosure determines whether the wireless apparatus is in the interference state and then determines whether the interference state belongs to the first interference type or the second interference type. If the wireless apparatus operates in the first bandwidth mode (the 40 MHz transmission bandwidth mode) and the interference state and the interference type have been determined, then corresponding processing operations can be performed according to the interference type to reduce the influence of the interference, thereby ensuring the throughput of the wireless apparatus.

Figure 5:
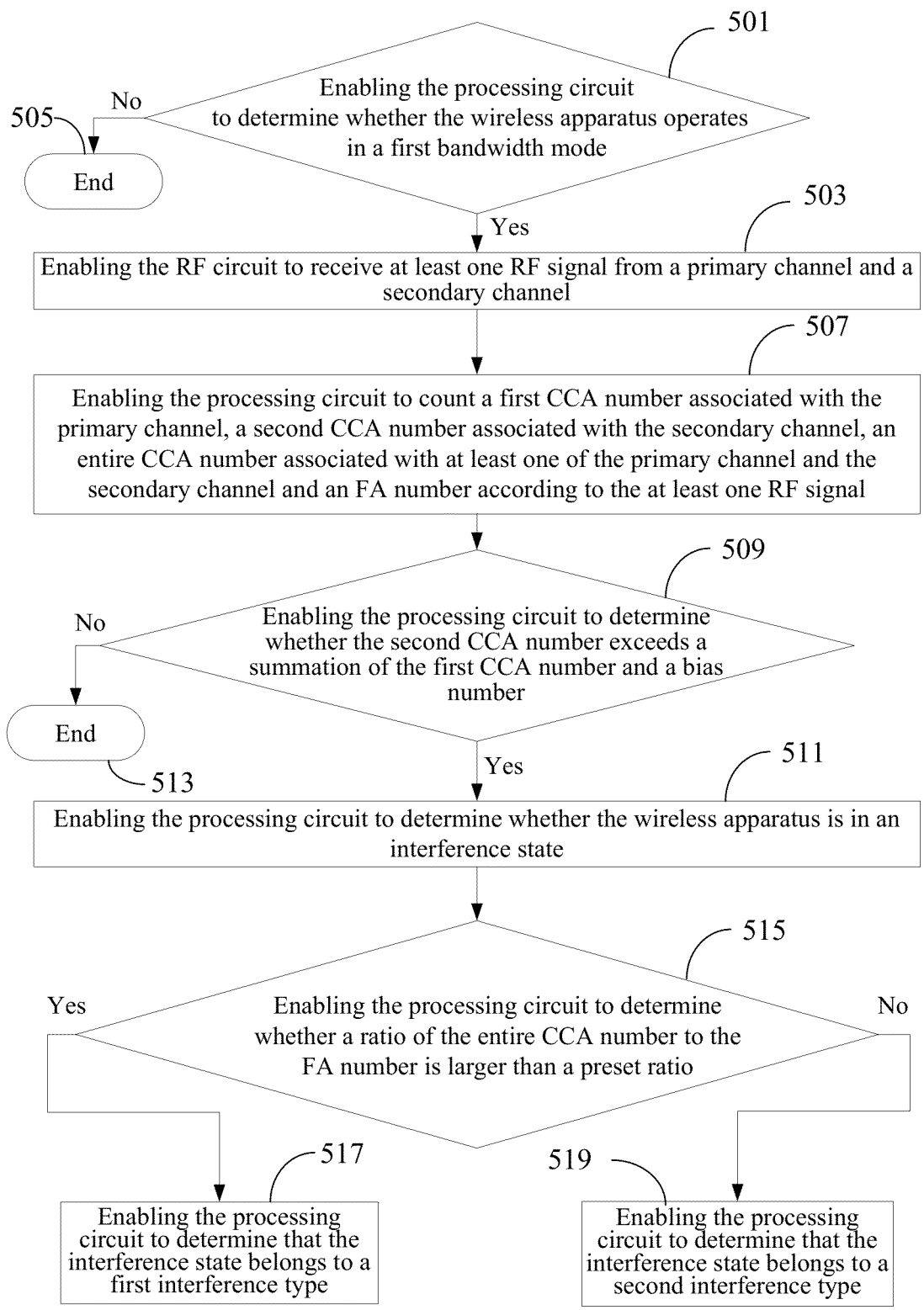
FIG. 5 is a flowchart diagram of an interference determination method in the fourth embodiment.

The fourth embodiment is an interference determination method, a flowchart diagram of which is depicted in FIG. 5. The interference determination method of the disclosure is for use in a wireless apparatus (e.g., the wireless apparatus 1 of the first embodiment), and the wireless apparatus comprises an RF circuit and a processing circuit electrically connected to the RF circuit.

First, step 501 is executed to enable the processing circuit to determine whether the wireless apparatus operates in a first bandwidth mode (the 40 MHz transmission bandwidth mode). If the wireless apparatus operates in the first bandwidth mode, then step 503 is executed to enable the RF circuit to receive at least one RF signal from a primary channel and a secondary channel. Otherwise, if the wireless apparatus does not operate in the first bandwidth mode, then step 505 is executed to end the interference determination method of the disclosure. In other words, when the wireless apparatus does not operate in the first bandwidth mode, it is unnecessary to continue to execute the other steps of the interference determination method of the disclosure; that is, the case in which the wireless apparatus operates in a second bandwidth mode (the 20 MHz transmission bandwidth mode) is not considered.

Subsequent to the step 503, step 507 is executed to enable the processing circuit to count a first CCA number associated with the primary channel, a second CCA number associated with the secondary channel, an entire CCA number associated with at least one of the primary channel and the secondary channel and an FA number according to the at least one RF signal. Then, step 509 is executed to enable the processing circuit to determine whether the second CCA number exceeds a summation of the first CCA number and a bias number. If the second CCA number exceeds the summation of the first CCA number and the bias number, then step 511 is executed to enable the processing circuit to determine whether the wireless apparatus is in an interference state. Otherwise, if the second CCA number does not exceed the summation of the first CCA number and the bias number, then step 513 is executed to end the interference determination method of the disclosure. In detail, when the second CCA number does not exceed the summation of the first CCA number and the bias number, the processing circuit considers that the wireless apparatus to not be in the interference state, so it is unnecessary to continue to execute the other steps of the interference determination method of the disclosure.

Subsequent to the step 511, step 515 is executed to enable the processing circuit to determine whether a ratio of the entire CCA number to the FA number is larger than a preset ratio. If the ratio of the entire CCA number to the FA number is larger than the preset ratio, then step 517 is executed to determine that the interference state belongs to a first interference type. Otherwise, if the ratio of the entire CCA number to the FA number is smaller than or equal to the preset ratio, then step 519 is executed to determine that the interference state belongs to a second interference type.

In addition to the aforesaid steps, the interference determination method of the fourth embodiment can also execute all the operations and functions set forth in the first embodiment. The method in which the fourth embodiment executes these operations and functions can be readily appreciated by those of ordinary skill in the art based on the explanation of the first embodiment, and thus, will not be further described herein.

Figure 6A:
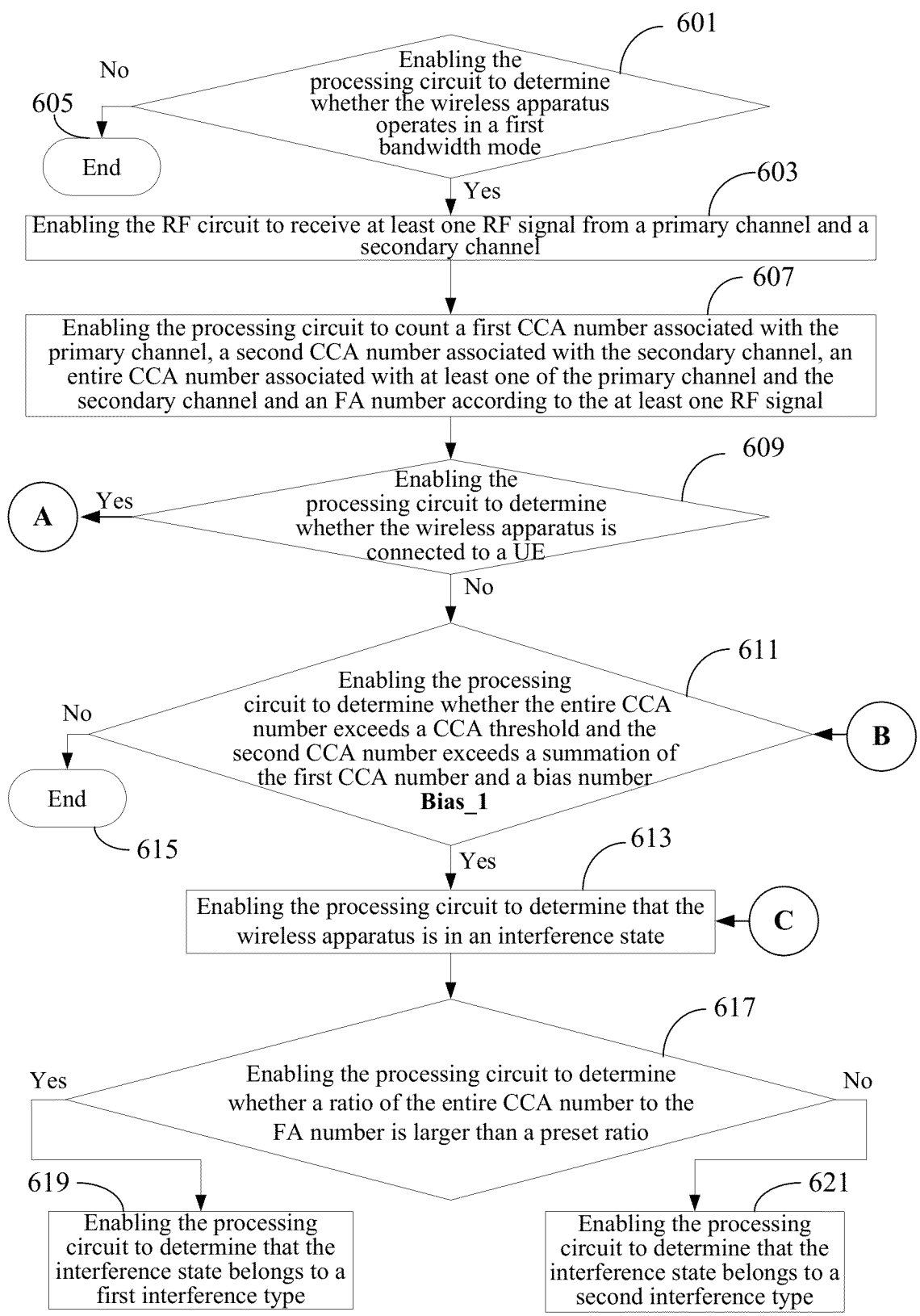
FIGS. 6A-6B are flowchart diagrams of an interference determination method in the fifth embodiment.
Figure 6B:
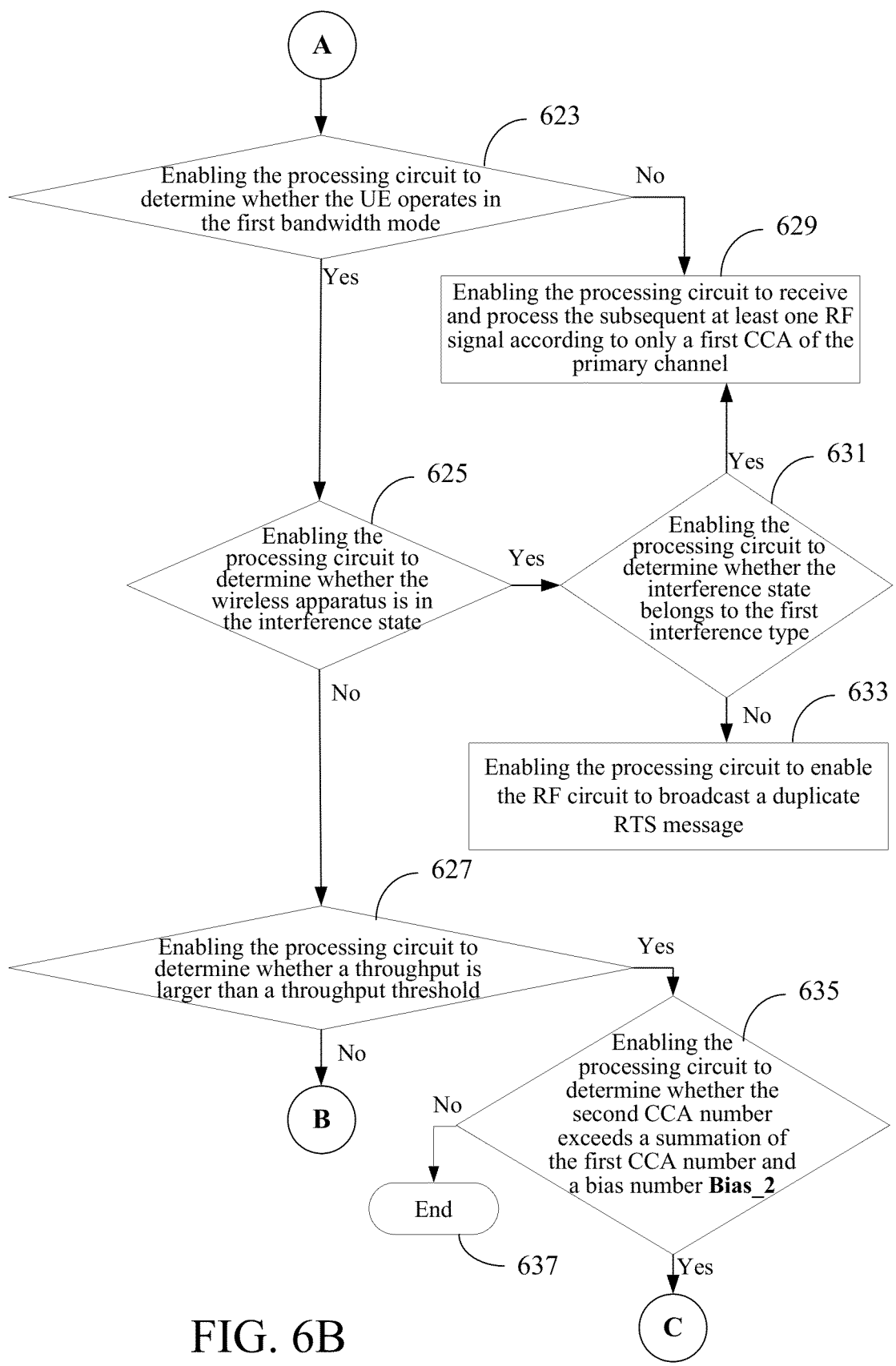

The fifth embodiment is an interference determination method, a flowchart diagram of which is depicted in FIGS. 6A to 6B. The interference determination method of the disclosure is for use in a wireless apparatus (e.g., the wireless apparatus 1 of the second embodiment), and the wireless apparatus comprises an RF circuit and a processing circuit electrically connected to the RF circuit.

First, step 601 is executed to enable the processing circuit to determine whether the wireless apparatus operates in a first bandwidth mode (the 40 MHz transmission bandwidth mode). If the wireless apparatus operates in the first bandwidth mode, then step 603 is executed to enable the RF circuit to receive at least one RF signal from a primary channel and a secondary channel. Otherwise, if the wireless apparatus does not operate in the first bandwidth mode, then step 605 is executed to end the interference determination method of the disclosure. In other words, when the wireless apparatus does not operate in the first bandwidth mode, it is unnecessary to continue to execute other steps of the interference determination method of the disclosure; that is, the case in which the wireless apparatus operates in a second bandwidth mode (the 20 MHz transmission bandwidth mode) is not considered.

Subsequent to the step 603, step 607 is executed to enable the processing circuit to count a first CCA number associated with the primary channel, a second CCA number associated with the secondary channel, an entire CCA number associated with at least one of the primary channel and the secondary channel and an FA number according to the at least one RF signal. Then, step 609 is executed to enable the processing circuit to determine whether the wireless apparatus is connected to a UE. If the wireless apparatus is not connected to the UE, then step 611 is executed to enable the processing circuit to determine whether the entire CCA number exceeds a CCA threshold and the second CCA number exceeds a summation of the first CCA number and a bias number Bias__1. If the entire CCA number exceeds the CCA threshold and the second CCA number exceeds the summation of the first CCA number and the bias number Bias__1, then step 613 is executed to enable the processing circuit to determine that the wireless apparatus is in an interference state. Otherwise, if the entire CCA number does not exceed the CCA threshold or the second CCA number does not exceed the summation of the first CCA number and the bias number Bias__1, then step 615 is executed to end the interference determination method of the disclosure. In detail, when the second CCA number does not exceed the summation of the first CCA number and the bias number Bias__1, the processing circuit considers the wireless apparatus to not be in the interference state, so it is unnecessary to continue to execute other steps of the interference determination method of the disclosure.

Subsequent to the step 613, step 617 is executed to enable the processing circuit to determine whether a ratio of the entire CCA number to the FA number is larger than a preset ratio. If the ratio of the entire CCA number to the FA number is larger than the preset ratio, then step 619 is executed to determine that the interference state belongs to a first interference type. Otherwise, if the ratio of the entire CCA number to the FA number is smaller than or equal to the preset ratio, then step 621 is executed to determine that the interference state belongs to a second interference type.

If it is determined in the step 609 that the wireless apparatus is connected to the UE, then step 623 is executed to enable the processing circuit to determine whether the UE operates in the first bandwidth mode. If the UE operates in the first bandwidth mode, then step 625 is executed to enable the processing circuit to determine whether the wireless apparatus is in the interference state. If the wireless apparatus is not in the interference state, then step 627 is executed to enable the processing circuit to determine whether a throughput is larger than a throughput threshold. If the throughput is smaller than or equal to the throughput threshold, then step 611 is executed. Otherwise, if the throughput is larger than the throughput threshold, then step 635 is executed to enable the processing circuit to determine whether the second CCA number exceeds a summation of the first CCA number and a bias number Bias__2.

If the second CCA number exceeds the summation of the first CCA number and the bias number Bias__2, then step 613 is executed. Otherwise, if the second CCA number does not exceed the summation of the first CCA number and the bias number Bias__2, then step 637 is executed to end the interference determination method of the disclosure. In detail, when the entire CCA number does not exceed the CCA threshold or the second CCA number does not exceed the summation of the first CCA number and the bias number Bias__2, the processing circuit considers the wireless apparatus to not be in the interference state, so it is unnecessary to continue executing the other steps of the interference determination method of the disclosure.

If it is determined in the step 625 that the wireless apparatus is in the interference state, then step 631 is executed to enable the processing circuit to determine whether the interference state belongs to the first interference type (i.e., whether the interference state belongs to the first interference type or the second interference type). If the interference state belongs to the first interference type, then step 629 is executed to enable the processing circuit to receive and process the subsequent at least one RF signal according to only a first CCA of the primary channel. Furthermore, if the interference state does not belong to the first interference type (i.e., belongs to the second interference type), then step 633 is executed to enable the processing circuit to enable the RF circuit to broadcast a duplicate RTS message. Furthermore, if the processing circuit determines in the step 623 that the UE does not operate in the first bandwidth mode (i.e., operates in the second bandwidth mode), then step 629 is also executed.

In addition to the aforesaid steps, the interference determination method of the fifth embodiment can also execute all the operations and functions set forth in the second embodiment. The method in which the fifth embodiment executes these operations and functions can be readily appreciated by those of ordinary skill in the art based on the explanation of the second embodiment, and thus, will not be further described herein.

Figure 7A:
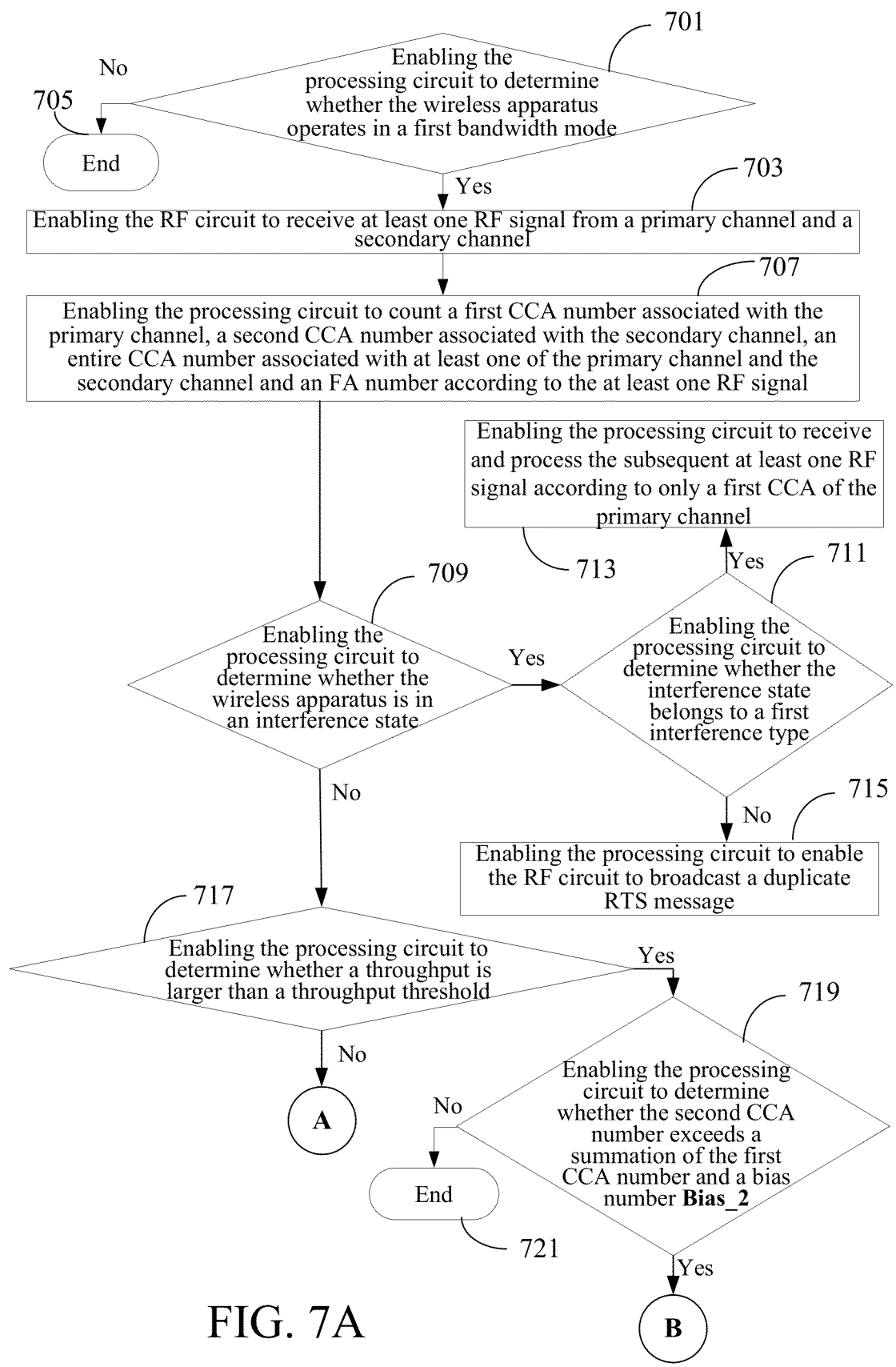
FIGS. 7A-7B are flowchart diagrams of an interference determination method in the sixth embodiment.
Figure 7B:
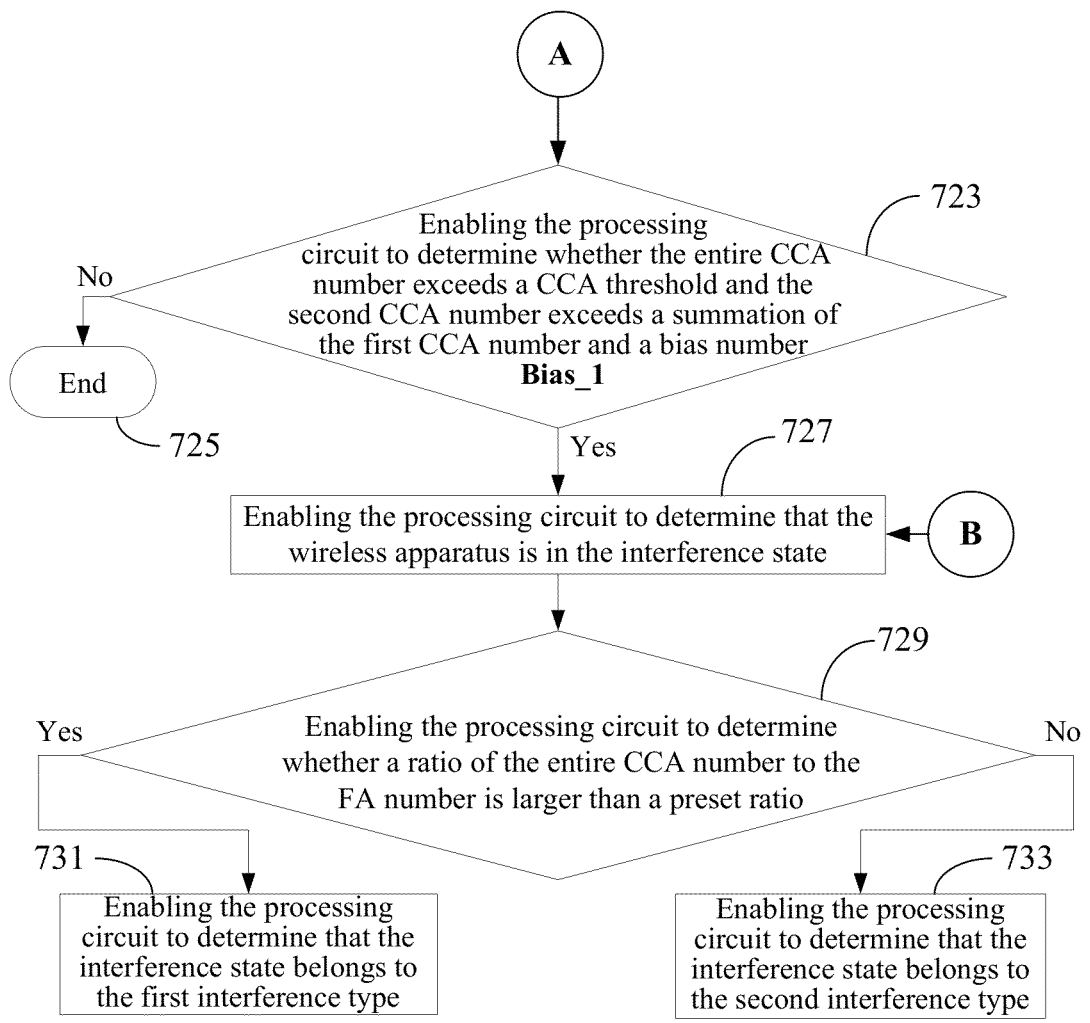

The sixth embodiment is an interference determination method, a flowchart diagram of which is depicted in FIG. 7A to FIG. 7B. The interference determination method of the disclosure is for use in a wireless apparatus (e.g., the wireless apparatus 1 of the third embodiment), and the wireless apparatus comprises an RF circuit and a processing circuit electrically connected to the RF circuit.

First, step 701 is executed to enable the processing circuit to determine whether the wireless apparatus operates in a first bandwidth mode (the 40 MHz transmission bandwidth mode). If the wireless apparatus operates in the first bandwidth mode, then step 703 is executed to enable the RF circuit to receive at least one RF signal from a primary channel and a secondary channel. Otherwise, if the wireless apparatus does not operate in the first bandwidth mode, then step 705 is executed to end the interference determination method of the disclosure. In other words, when the wireless apparatus does not operate in the first bandwidth mode, it is unnecessary to continue executing the other steps of the interference determination method of the disclosure; that is, the case in which the wireless apparatus operates in a second bandwidth mode (the 20 MHz transmission bandwidth mode) is not considered.

Subsequent to the step 703, step 707 is executed to enable the processing circuit to count a first CCA number associated with the primary channel, a second CCA number associated with the secondary channel, an entire CCA number associated with at least one of the primary channel and the secondary channel and an FA number according to the at least one RF signal. Then, step 709 is executed to enable the processing circuit to determine whether the wireless apparatus is in an interference state. If the wireless apparatus is not in the interference state, then step 711 is executed to enable the processing circuit to determine whether the interference state belongs to a first interference type (i.e., determine that the interference state belongs to one of the first interference type and a second interference type). If the interference state belongs to the first interference type, then step 713 is executed to enable the processing circuit to receive and process the subsequent at least one RF signal according to only a first CCA of the primary channel. Furthermore, if the interference state does not belong to the first interference type (i.e., belongs to the second interference type), then step 715 is executed to enable the processing circuit to enable the RF circuit to broadcast a duplicate RTS message.

On the other hand, if it is determined in the step 709 that the wireless apparatus is not in the interference state, then step 717 is executed to enable the processing circuit to determine whether a throughput is larger than a throughput threshold. If the throughput is smaller than or equal to the throughput threshold, then step 723 is executed to enable the processing circuit to determine whether the entire CCA number exceeds a CCA threshold and the second CCA number exceeds a summation of the first CCA number and a bias number Bias_1. If the entire CCA number exceeds the CCA threshold and the second CCA number exceeds the summation of the first CCA number and the bias number Bias_1, then step 727 is executed to enable the processing circuit to determine that the wireless apparatus is in the interference state. Otherwise, if the entire CCA number does not exceed the CCA threshold or the second CCA number does not exceed the summation of the first CCA number and the bias number Bias_1, then step 725 is executed to end the interference determination method of the disclosure.

In detail, when the entire CCA number does not exceed the CCA threshold or the second CCA number does not exceed the summation of the first CCA number and the bias number Bias_1, the processing circuit considers the wireless apparatus to not be in the interference state, so it is unnecessary to continue to execute the other steps of the interference determination method of the disclosure.

Subsequent to the step 727, step 729 is executed to enable the processing circuit to determine whether a ratio of the entire CCA number to the FA number is larger than a preset ratio. If the ratio of the entire CCA number to the FA number is larger than the preset ratio, then step 731 is executed to enable the processing circuit to determine that the interference state belongs to the first interference type. Otherwise, if the ratio of the entire CCA number to the FA number is smaller than or equal to the preset ratio, then step 733 is executed to determine that the interference state belongs to the second interference type.

Furthermore, if it is determined in the step 717 that the throughput is larger than the throughput threshold, then step 719 is executed to enable the processing circuit to determine whether the second CCA number exceeds a summation of the first CCA number and a bias number Bias_2. If the second CCA number exceeds the summation of the first CCA number and the bias number Bias_2, then step 727 is executed. Otherwise, if the second CCA number does not exceed the summation of the first CCA number and the bias number Bias_2, then step 721 is executed to end the interference determination method of the disclosure.

In detail, when the entire CCA number does not exceed the CCA threshold or the second CCA number does not exceed the summation of the first CCA number and the bias number Bias_2, the processing circuit considers that the wireless apparatus is not in the interference state, so it is unnecessary to continue executing other steps of the interference determination method of the disclosure.

In addition to the aforesaid steps, the interference determination method of the sixth embodiment can also execute all the operations and functions set forth in the third embodiment. The method in which the sixth embodiment executes these operations and functions can be readily appreciated by those of ordinary skill in the art based on the explanation of the third embodiment, and thus will not be further described herein.

According to the above descriptions, by determining signal interference and by performing corresponding processing operations according to different interference types, the disclosure can reduce the influence of the interference to ensure the throughput of the WLAN wireless apparatus. Therefore, when the WLAN wireless apparatus operates in the 40 MHz transmission bandwidth mode, the disclosure can reduce the possibility that the throughput of the WLAN wireless apparatus is affected by signal interference from other wireless apparatuses.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A wireless apparatus comprising:
a radio frequency (RF) circuit, being configured to receive at least one RF signal from a primary channel and a secondary channel; and
a processing circuit, being electrically connected to the RF circuit and configured to determine that the wireless apparatus operates in a first bandwidth mode, count a first clear channel assessment (CCA) number associated with the primary channel, a second CCA number associated with the secondary channel, an entire CCA number associated with at least one of the primary channel and the secondary channel and a false alarm (FA) number according to the at least one RF signal, determine that the second CCA number exceeds a summation of the first CCA number and a bias number so as to determine that the wireless apparatus is in an interference state, and determine that the interference state belongs to one of a first interference type and a second interference type according to a ratio of the entire CCA number to the FA number.

2. The wireless apparatus as claimed in claim 1, wherein the processing circuit further determines that the ratio is larger than a preset ratio so as to determine that the interference state belongs to the first interference type.

3. The wireless apparatus as claimed in claim 1, wherein the processing circuit further determines that the ratio is smaller than or equal to a preset ratio so as to determine that the interference state belongs to the second interference type.

4. The wireless apparatus as claimed in claim 1, wherein the processing circuit further determines that the wireless apparatus operates in a first bandwidth mode and is not connected to a user equipment (UE) yet, and that the entire CCA number exceeds a CCA threshold and the second CCA number exceeds the summation of the first CCA number and the bias number so as to determine that the wireless apparatus is in the interference state.

5. The wireless apparatus as claimed in claim 1, wherein the processing circuit further determines that the wireless apparatus has been connected to a UE.

6. The wireless apparatus as claimed in claim 5, wherein the processing circuit further determines that the UE operates in the first bandwidth mode, that the wireless apparatus is not in the interference state yet, that a throughput is smaller than or equal to a throughput threshold, and that the entire CCA number exceeds a CCA threshold and the second CCA number exceeds the summation of the first CCA number and the bias number so as to determine that the wireless apparatus is in the interference state.

7. The wireless apparatus as claimed in claim 5, wherein the processing circuit further determines that the UE operates in the first bandwidth mode, that the wireless apparatus is not in the interference state yet, and that a throughput is larger than a throughput threshold.

8. The wireless apparatus as claimed in claim 5, wherein the processing circuit further determines that the UE operates in the first bandwidth mode, that the wireless apparatus has been in the interference state, and that the interference state belongs to the first interference type so that the processing circuit receives and processes the subsequent at least one RF signal according to only a first CCA of the primary channel.

9. The wireless apparatus as claimed in claim 5, wherein the processing circuit further determines that the UE operates in the first bandwidth mode, that the wireless apparatus has been in the interference state, and that the interference state belongs to the second interference type so that the processing circuit enables the RF circuit to broadcast a duplicate request-to-send (duplicate RTS) message.

10. The wireless apparatus as claimed in claim 5, wherein the processing circuit further determines that the UE operates in a second bandwidth mode so that the processing circuit receives and processes the subsequent at least one RF signal according to only a first CCA of the primary channel.

11. The wireless apparatus as claimed in claim 1, wherein the processing circuit further determines that the wireless apparatus is not in the interference state yet, that a throughput is smaller than or equal to a throughput threshold, and that the entire CCA number exceeds a CCA threshold and the second CCA number exceeds the summation of the first CCA number and the bias number so as to determine that the wireless apparatus is in the interference state.

12. The wireless apparatus as claimed in claim 1, wherein the processing circuit further determines that the wireless apparatus is not in the interference state yet, and that a throughput is larger than a throughput threshold.

13. The wireless apparatus as claimed in claim 1, wherein the processing circuit further determines that the wireless apparatus has been in the interference state, and that the interference state belongs to the first interference type so that the processing circuit receives and processes the subsequent at least one RF signal according to only a first CCA of the primary channel.

14. The wireless apparatus as claimed in claim 1, wherein the processing circuit further determines that the wireless apparatus has been in the interference state, and that the interference state belongs to the second interference type so that the processing circuit enables the RF circuit to broadcast a duplicate RTS message.

15. The wireless apparatus as claimed in claim 1, wherein the processing circuit comprises a plurality of counters for counting the first CCA number, the second CCA number, the entire CCA number and the FA number, respectively.

16. The wireless apparatus as claimed in claim 1, wherein the wireless apparatus conforms to an IEEE 802.11n standard, and is one of an access point and a wireless network card.

17. An interference determination method for use in a wireless apparatus, the wireless apparatus comprising an RF circuit and a processing circuit electrically connected to the RF circuit, the interference determination method comprising the following steps of:
(a) enabling the processing circuit to determine that the wireless apparatus operates in a first bandwidth mode;
(b) enabling the RF circuit to receive at least one RF signal from a primary channel and a secondary channel;
(c) enabling the processing circuit to count a first CCA number associated with the primary channel, a second CCA number associated with the secondary channel, an entire CCA number associated with at least one of the primary channel and the secondary channel and an FA number according to the at least one RF signal;
(d) enabling the processing circuit to determine that the second CCA number exceeds a summation of the first CCA number and a bias number so as to determine that the wireless apparatus is in an interference state; and
(e) enabling the processing circuit to determine that the interference state belongs to one of a first interference type and a second interference type according to a ratio of the entire CCA number to the FA number.

18. The interference determination method as claimed in claim 17, wherein the step (e) further comprises the following step of:
(e1) enabling the processing circuit to determine that the ratio is larger than a preset ratio so as to determine that the interference state belongs to the first interference type.

19. The interference determination method as claimed in claim 17, wherein the step (e) further comprises the following step of:
(e2) enabling the processing circuit to determine that the ratio is smaller than or equal to a preset ratio so as to determine that the interference state belongs to the second interference type.

20. The interference determination method as claimed in claim 17, wherein before the step (d), the interference determination method further comprises the following step of:
(f1) enabling the processing circuit to determine that the wireless apparatus is not connected to a UE yet; and
the step (d) further comprises the following step of:
(d1) enabling the processing circuit to determine that the entire CCA number exceeds a CCA threshold and the second CCA number exceeds the summation of the first CCA number and the bias number so as to determine that the wireless apparatus is in the interference state.

21. The interference determination method as claimed in claim 17, wherein before the step (d), the interference determination method further comprises the following step of:
(f2) enabling the processing circuit to determine that the wireless apparatus has been connected to a UE.

22. The interference determination method as claimed in claim 21, wherein before the step (d), the interference determination method further comprises the following steps of:
(f3) enabling the processing circuit to determine that the UE operates in the first bandwidth mode;
(f4) enabling the processing circuit to determine that the wireless apparatus is not in the interference state yet; and (f5) enabling the processing circuit to determine that a throughput is smaller than or equal to a throughput threshold; and the step (d) further comprises the following step of:

(d1) enabling the processing circuit to determine that the entire CCA number exceeds a CCA threshold and the second CCA number exceeds the summation of the first CCA number and the bias number so as to determine that the wireless apparatus is in the interference state.

23. The interference determination method as claimed in claim 21, wherein before the step (d), the interference determination method further comprises the following steps of:

(f3) enabling the processing circuit to determine that the UE operates in the first bandwidth mode;

(f4) enabling the processing circuit to determine that the wireless apparatus is not in the interference state yet; and (f6) enabling the processing circuit to determine that a throughput is larger than a throughput threshold.

24. The interference determination method as claimed in claim 17, wherein after the step (e), the interference determination method further comprises the following steps of:

(f2) enabling the processing circuit to determine that the wireless apparatus has been connected to a UE;

(f3) enabling the processing circuit to determine that the UE operates in the first bandwidth mode;

(f7) enabling the processing circuit to determine that the wireless apparatus has been in the interference state;

(f8) enabling the processing circuit to determine that the interference state belongs to the first interference type; and (f9) enabling the processing circuit to receive and process the subsequent at least one RF signal according to only a first CCA of the primary channel.

25. The interference determination method as claimed in claim 17, wherein after the step (e), the interference determination method further comprises the following steps of:

(f2) enabling the processing circuit to determine that the wireless apparatus has been connected to a UE;

(f3) enabling the processing circuit to determine that the UE operates in the first bandwidth mode;

(f7) enabling the processing circuit to determine that the wireless apparatus has been in the interference state;

(f10) enabling the processing circuit to determine that the interference state belongs to the second interference type; and (f11) enabling the processing circuit to enable the RF circuit to broadcast a duplicate RTS message.

26. The interference determination method as claimed in claim 17, wherein after the step (e), the interference determination method further comprises the following steps of:

(f2) enabling the processing circuit to determine that the wireless apparatus has been connected to a UE;

(f12) enabling the processing circuit to determine that the UE operates in a second bandwidth mode; and (f13) enabling the processing circuit to receive and process the subsequent at least one RF signal according to only a first CCA of the primary channel.

27. The interference determination method as claimed in claim 17, wherein before the step (d), the interference determination method further comprises the following steps of:

(f4) enabling the processing circuit to determine that the wireless apparatus is not in the interference state yet; and (f5) enabling the processing circuit to determine that a throughput is smaller than or equal to a throughput threshold; and the step (d) further comprises the following step of:

(d1) enabling the processing circuit to determine that the entire CCA number exceeds a CCA threshold and the second CCA number exceeds the summation of the first CCA number and the bias number so as to determine that the wireless apparatus is in the interference state.

28. The interference determination method as claimed in claim 17, wherein before the step (d), the interference determination method further comprises the following steps of:

(f4) enabling the processing circuit to determine that the wireless apparatus is not in the interference state yet; and (f6) enabling the processing circuit to determine that a throughput is larger than a throughput threshold.

29. The interference determination method as claimed in claim 17, wherein after the step (e), the interference determination method further comprises the following steps of:

(f7) enabling the processing circuit to determine that the wireless apparatus has been in the interference state;

(f8) enabling the processing circuit to determine that the interference state belongs to the first interference type; and (f9) enabling the processing circuit to receive and process the subsequent at least one RF signal according to only a first CCA of the primary channel.

30. The interference determination method as claimed in claim 17, wherein after the step (e), the interference determination method further comprises the following steps of:

(f7) enabling the processing circuit to determine that the wireless apparatus has been in the interference state;

(f10) enabling the processing circuit to determine that the interference state belongs to the second interference type; and (f11) enabling the processing circuit to enable the RF circuit to broadcast a duplicate RTS message.

31. The interference determination method as claimed in claim 17, wherein the processing circuit comprises a plurality of counters for counting the first CCA number, the second CCA number, the entire CCA number and the FA number, respectively.

32. The interference determination method as claimed in claim 17, wherein the wireless apparatus conforms to an IEEE 802.11n standard, and is one of an access point and a wireless network card.

* * * * *